US010414095B2

(12) United States Patent
Frohnmaier et al.

(10) Patent No.: US 10,414,095 B2
(45) Date of Patent: Sep. 17, 2019

(54) DEVICE AND METHOD OF EXPOSURE CONTROL IN A DEVICE FOR PRODUCING A THREE-DIMENSIONAL OBJECT

(71) Applicant: EOS GmbH Electro Optical Systems, Krailling (DE)

(72) Inventors: Markus Frohnmaier, Hengersberg (DE); Michael Göth, München (DE); Robert Achim Domröse, Germering (DE); Stefan Fröbe, München (DE); Joachim Wichner, München (DE); Harald Häger, Olching (DE)

(73) Assignee: EOS GmbH Electro Optical Systems, Krailling (DE)

( * ) Notice: Subject to any disclaimer, the term of this patent is extended or adjusted under 35 U.S.C. 154(b) by 88 days.

(21) Appl. No.: 15/628,397

(22) Filed: Jun. 20, 2017

(65) Prior Publication Data

US 2018/0001563 A1    Jan. 4, 2018

(30) Foreign Application Priority Data

Jul. 1, 2016 (DE) ........................ 10 2016 212 063

(51) Int. Cl.
*B29C 35/08* (2006.01)
*B29C 64/386* (2017.01)
*B22F 3/105* (2006.01)
*B29C 64/393* (2017.01)
*B33Y 50/02* (2015.01)
(Continued)

(52) U.S. Cl.
CPC .......... *B29C 64/386* (2017.08); *B22F 3/1055* (2013.01); *B29C 35/08* (2013.01); *B29C 64/393* (2017.08); *B29C 70/543* (2013.01);

*B33Y 50/02* (2014.12); *B29C 64/135* (2017.08); *B29C 64/153* (2017.08); *B29C 2948/92571* (2019.02);
(Continued)

(58) Field of Classification Search
None
See application file for complete search history.

(56) References Cited

U.S. PATENT DOCUMENTS 6,359,701 B1 * 3/2002 Yamada ................. B41J 2/5056
                                                   347/14
6,995,334 B1    2/2006 Kovacevic et al.
2008/0241392 A1 10/2008 Dimter et al.
(Continued)

FOREIGN PATENT DOCUMENTS

DE    102011087374 A1    5/2013
DE    102013205724       * 10/2014 ............ B22F 3/1055
(Continued)

*Primary Examiner* — Bernard G Lindsay
(74) *Attorney, Agent, or Firm* — Seyfarth Shaw LLP

(57) ABSTRACT

An exposure control device serves for equipping and/or retrofitting a generative layer-wise building device. The exposure control device has a first data output interface, at which control commands can be output to the exposure device. The control commands specify one of a plurality of exposure types defined by a predetermined combination of a radiation energy density to be emitted by the exposure device and a scanning pattern with which the radiation is being directed to a region of a layer of the building material. The exposure control device also includes a second data output interface at which an exposure type can be output in real time in relation to a timing of the output of a control command specifying this exposure type.

14 Claims, 2 Drawing Sheets

(51) Int. Cl.
  *B29C 70/54* (2006.01)
  *B29C 64/135* (2017.01)
  *B29C 64/153* (2017.01)
  *G05B 15/02* (2006.01)

(52) U.S. Cl.
  CPC .... *B29C 2949/78563* (2013.01); *G05B 15/02* (2013.01); *G05B 2219/49023* (2013.01)

(56) References Cited

U.S. PATENT DOCUMENTS

| | | | |
|---|---|---|---|
| 2013/0168902 A1 | 7/2013 | Herzog et al. | |
| 2014/0046473 A1* | 2/2014 | Boynton | H04N 1/00827 700/119 |
| 2014/0332507 A1 | 11/2014 | Fockele | |
| 2015/0154575 A1* | 6/2015 | Krieger | G06Q 30/0603 705/26.1 |
| 2016/0067923 A1* | 3/2016 | James | B29C 64/153 264/497 |
| 2016/0167131 A1 | 6/2016 | Weilhammer et al. | |
| 2016/0236414 A1* | 8/2016 | Reese | G05B 19/4099 |
| 2016/0243618 A1* | 8/2016 | Heugel | B22F 3/1055 |
| 2016/0279706 A1* | 9/2016 | Domrose | B22F 3/1055 |
| 2017/0021570 A1* | 1/2017 | Sugiura | G06F 17/50 |
| 2017/0246797 A1 | 8/2017 | Lambrecht et al. | |
| 2017/0246810 A1* | 8/2017 | Gold | B33Y 50/02 |

FOREIGN PATENT DOCUMENTS

| | | |
|---|---|---|
| DE | 102013212803 A1 | 1/2015 |
| DE | 102014215213 | 4/2015 |
| WO | 1997/014549 A1 | 4/1997 |
| WO | 2007/147221 A1 | 12/2007 |
| WO | 2008116518 | 10/2008 |
| WO | 2015071183 | 5/2015 |

* cited by examiner

DEVICE AND METHOD OF EXPOSURE CONTROL IN A DEVICE FOR PRODUCING A THREE-DIMENSIONAL OBJECT

TECHNICAL FIELD OF THE INVENTION

The present invention is directed to an exposure control device and a method of exposure control within the scope of producing at least one three-dimensional object by a layer-wise application and selective solidification of a building material, as well as to a device and a method of producing at least one three-dimensional object layer-wise.

BACKGROUND OF THE INVENTION

Devices and methods of this type are used, for example, for rapid prototyping, rapid tooling or additive manufacturing. An example of such a method is known by the name "selective laser sintering or laser melting". With this method, repeatedly a thin layer of a building material in powder form is applied and the building material is selectively solidified with a laser beam by selectively irradiating positions corresponding to a cross-section of the object to be produced in each layer. In doing so, the powder grains are melted partially or completely at these positions by the energy delivered by the radiation, so that they exist joined together as a solid body after cooling.

The melt pool resulting from the energy input can be detected by a detector, as described, for example, in the document U.S. 2013/0168902 A1. The measured and evaluated melt pool signal correlates with the resulting quality in the real object. In order to evaluate the quality of the object, the detected sensor values are stored together with the coordinate values localizing the sensor values in the object and are visualized by means of a visualization device in relation to their detection location in the object.

From document DE 10 2013 212 803 A1, it is furthermore known to divide an object cross-section to be solidified into different model sub-regions, whereby the building material is solidified in the at least two different model sub-regions in mutually different ways. The model sub-regions can be, for example, a contour region and an inner region of the cross-section of the object. Furthermore, a model sub-region can also be a downwardly facing outer or inner surface of the object.

Furthermore, it is known, for example, from WO 97/14549 to produce a support region around the object. Here, too, sub-regions of the support region are produced with different features by solidifying the building material differently.

If different sub-regions of the object cross-sections are solidified using different exposure types, the melt pools resulting from the impact of the radiation on the building material to be solidified can have different properties, too, which can result in different melt pool signals. If the exposure type is not taken into account during the evaluation of the melt pool signal, this may lead to an incorrect classification of properties and/or a quality of the object.

SUMMARY OF THE INVENTION

The object of the present invention is to provide an alternative, respectively improved, device and an alternative, respectively improved, method for determining the quality of the object.

The object is achieved by an exposure control device according to claim 1, a layer-wise building device according to claim 8, a method of exposure control according to claim 14 and a generative method for a layer-wise production according to claim 15. Further developments of the invention are each given in the dependent claims. Moreover, the methods can also be further developed by the features of the devices described below or given in the dependent claims, or vice versa, or the features of a device can also be used for a further development in another device.

The exposure control device according to the invention serves for equipping and/or retrofitting a generative layer-wise building device for production of at least one three-dimensional object from a building material layer by layer by solidification of the building material by means of heat supply to positions corresponding to the cross-section of an object in a layer by selectively scanning the layer with electromagnetic radiation or particle radiation. The generative layer-wise building device has an exposure device which emits electromagnetic radiation or particle radiation and is configured to irradiate positions to be solidified in a layer in such a way that after cooling they exist as an object cross-section or part of the object cross-section in the respective layer. The exposure control device has a first data output interface, at which control commands can be output to the exposure device so that it scans, in accordance with the control commands, positions of a layer of the building material with electromagnetic radiation or particle radiation. The control commands which are output via the first data output interface specify one of a plurality of exposure types, wherein an exposure type is defined by a predetermined combination of a radiation energy density to be emitted by the exposure device and a scanning pattern with which the radiation is being directed to a region of a layer of the building material. Furthermore, the exposure control device has a second data output interface at which an exposure type can be output in real time in relation to a timing of the output of a control command specifying this exposure type.

The output of an exposure type in real time in relation to a timing of the output of the corresponding control command means that the output of the exposure type takes place within a predetermined period of time before or after the output of the associated control command. Here, the control command and the exposure type can be output, in particular, at predetermined points of time, that is, when a control command for the irradiation of a next (sub-) region of a layer is output.

This makes it possible, for example, to provide the exposure type used for irradiation of a region of the object cross-section in the respective layer within a limited, in particular precisely defined or definable, time offset with respect to the control command which is output. This allows, for example, the storage and/or evaluation of a melt pool signal in conjunction with the exposure type, with which the energy beam generates the melt pool. The melt pool signal can then be set in correlation with a quality resulting in the object and/or a further property of the object. Providing information on the corresponding exposure type can, for example, help to evaluate the melt pool signal correctly and thus to arrive at the correct conclusions about the quality of the object and/or further properties of the object.

Preferably, the exposure control device can output the data at the first and second data output interfaces at the same time. Thus, for example, the control command and the information on the exposure type used can be output with a minimum time offset.

Alternatively, during operation of the exposure control device, the time offset between the output of an exposure type via the second data output interface and the output of a control command specifying this exposure type via the first data output interface is always less than 5 milliseconds (ms), preferably 4 ms, particularly preferred 3 ms. This makes it possible, for example, to keep the time offset between the outputs small in order to obtain a good correlation, for example, of a determined melt pool signal with the corresponding exposure type of the energy beam.

Preferably, the exposure control device further comprises a buffer for storing control commands to be output via the first data output interface. Thus, for example, the control commands to be output to the exposure device can be cached, and the exposure control device can access a control command to be output without a time delay. In this way, it can be avoided, for example, that time delays occur during the building process due to control commands which are output belatedly.

Preferably, in the exposure control device, with the output of a control command via the first data output interface, which control command specifies the coordinates of a location to be irradiated by the exposure device on the layer of building material, these coordinates are output in a temporally coordinated manner via the second data output interface. By providing the coordinates, for example, a detected melt pool signal and/or an exposure type can be assigned to the corresponding detection location in the object.

Preferably, the time offset between the output of the coordinates via the second data output interface and the output of a control command specifying the coordinates of a location to be irradiated by the exposure device on the layer of building material via the first data output interface is always below 5 ms, preferably 4 ms, particularly preferred 3 ms. This makes it possible, for example, to keep the time offset between the outputs small in order to obtain a good correlation, for example, of a determined melt pool signal and/or the exposure type of the energy beam with the detection location in the object.

Preferably, the exposure device emits at least one beam with a (pre- or dynamically) defined diameter and/or a (pre- or dynamically) defined cross-sectional shape of the cross-section of the beam and/or a (pre- or dynamically) defined intensity profile and the exposure types furthermore specify the diameter and/or the shape of the cross-section of the beam and/or the intensity profile. In this way, for example, further, different exposure types can be realized.

A generative layer-wise building device for a production of at least one three-dimensional object from a building material layer by layer by solidification of the building material by means of heat supply to positions corresponding to the cross-section of an object in a layer, by selectively scanning the layer with electromagnetic radiation or particle radiation, comprises an exposure control device according to the invention as described above. Furthermore, the generative layer-wise building device has an application device for applying a layer of the building material on the surface of a building support or an already existing layer, an exposure device which emits electromagnetic radiation or particle radiation and is configured to irradiate positions to be solidified in a layer in such a way that after cooling they exist as an object cross-section or part of the object cross-section in the respective layer, as well as a control device which controls the application device and the exposure device so that an application step and a solidification step are repeated successively until all cross-sections of the at least one three-dimensional object to be produced are solidified. Thus, the effects given above for the exposure control device can be obtained in a device for producing a three-dimensional object comprising the exposure control device.

Preferably, the generative layer-wise building device is configured such that the control device transfers to the exposure control device the control commands which are output by the latter to the exposure device. Thus, for example, a central allocation unit can be implemented for the control commands to be transferred.

The generative layer-wise building device preferably also comprises a process monitoring device, which is connected to the second data output interface. For example, process data can be determined and/or evaluated using the process monitoring device. Furthermore, via the connection to the second data output interface, the process data can be assigned, for example, to an exposure type and/or to their detection location in the object.

Preferably, the process monitoring device is capable of detecting the temporary or permanent changes of a property of the building material that are generated when the radiation emitted by the exposure device is incident on the building material. Thus, for example, a property of the melt pool, e.g. in the form of measurement data, can be detected.

Furthermore, the process monitoring device comprises at least one sensor which is capable of detecting a process radiation emitted (this also includes "reflected") by the building material upon the incidence of the radiation emitted by the exposure device onto the building material. The melt pool signal detected by the sensor can thus be forwarded, for example, to the process monitoring device and can be evaluated and/or stored and/or visualized with further process information such as, for example, the exposure type and/or the corresponding coordinates.

Preferably, the process monitoring device and the control device are connected to a common database. Thus, the process monitoring device can, for example, resort to data provided by the control device, such as the start and end point of the building process. Furthermore, the database can serve, for example, as a data storage for data provided.

According to the invention, a method of exposure control is for usage in a generative layer-wise building device for a production of at least one three-dimensional object from a building material layer by layer by solidification of the building material by means of heat supply to positions corresponding to the cross-section of an object in a layer, by selectively scanning the layer with electromagnetic radiation or particle radiation. The generative layer-wise building device has an exposure device which emits electromagnetic radiation or particle radiation and is configured to irradiate positions to be solidified in a layer in such a way that after cooling they exist as an object cross-section or part of the object cross-section in the respective layer and an exposure control device with a first data output interface, at which control commands can be output to the exposure device so that it scans, in accordance with the control commands, positions of a layer of the building material with electromagnetic radiation or particle radiation. The control commands which are output via the first data output interface specify one of a plurality of exposure types wherein an exposure type is defined by a predetermined combination of a radiation energy density to be emitted by the exposure device and a scanning pattern with which the radiation is being directed to a region of a layer of the building material. Via a second data output interface, the exposure control device outputs an exposure type in real time in relation to a timing of the output of a control command specifying this exposure type.

Thus, for example, it is possible to provide the exposure type used for irradiation of a region of the object cross-section in the respective layer within a limited time offset with respect to the control command which is output.

A further method according to the present invention serves for the production of at least one three-dimensional object by use of a generative layer-wise building device, wherein in the generative layer-wise building device the at least one object is produced layer by layer by solidification of a building material by means of a heat supply to the positions corresponding to the object cross-section of an object in a layer, by selectively scanning the layer with electromagnetic radiation or particle radiation. The method at least comprises the following steps:

an application step of providing a layer of the building material on a building support or an already existing layer of the building material, and a solidification step of solidifying the applied layer by means of an exposure device, which emits electromagnetic radiation or particle radiation, by irradiating all positions to be solidified in a layer in such a way that after cooling they exist as an object cross-section or part of the object cross-section in the respective layer.

Here, the application step and the solidification step are repeated successively until all cross-sections of the at least one three-dimensional object to be produced are solidified. Furthermore, the method comprises a step of supplying control commands from the method of exposure control according to the invention as described above.

With this method, for example, a three-dimensional object can be produced layer-wise whilst obtaining the effects given above for the method of exposure control.

BRIEF DESCRIPTION OF THE DRAWINGS

Further features and expediencies of the invention are set out in the description of exemplary embodiments with the aid of the attached drawings.

DETAILED DESCRIPTION OF THE EMBODIMENTS

Figure 1:
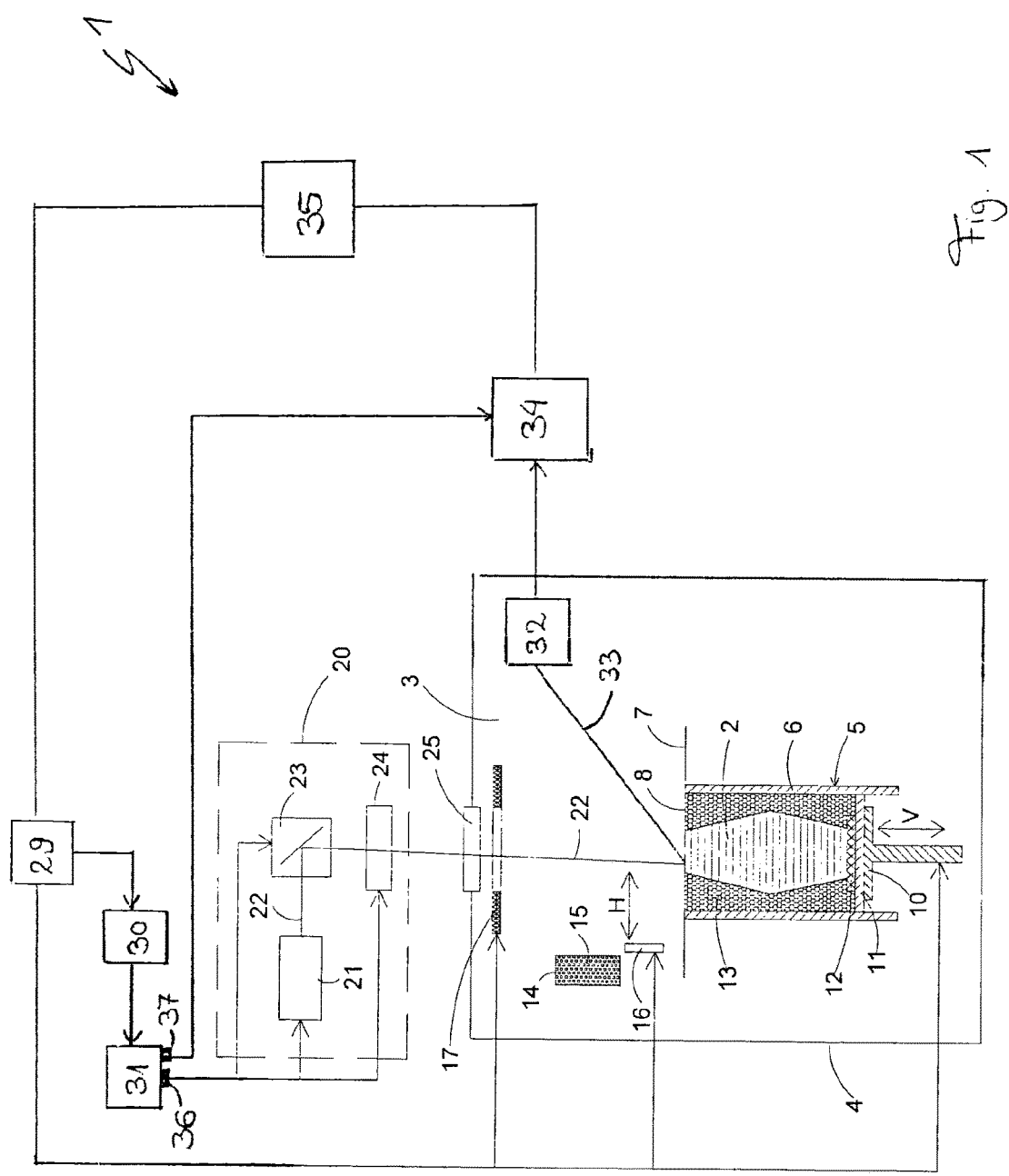
FIG. 1 shows a schematic view, partially in cross-section, of a device for generatively producing a three-dimensional object according to an exemplary embodiment of the present invention.

Hereafter, an exemplary embodiment according to the present invention is described with reference to FIG. 1. The device shown in FIG. 1 is a laser sintering or laser melting device. For building an object 2, it comprises a processing chamber 3 with a chamber wall 4.

A container 5 open to the top with a container wall 6 is arranged in the process chamber 3. A working plane 7 is defined by the upper opening of the container 5, wherein the area of the working plane 7 located within the opening, which can be used for building the object 2, is referred to as build area 8.

In the container 5 a carrier 10 is arranged that can be moved in a vertical direction V and to which a base plate 11 is attached which seals the container 5 at the bottom and thus forms the bottom thereof. The base plate 11 can be formed as a plate separately from the carrier 10 which plate is fixed to the carrier 10, or it can be integrally formed with the carrier 10. Depending on the powder and process used, a building platform 12 can also be arranged on the base plate 11 as a building support, on which the object 2 is built. However, the object 2 can also be built on the base plate 11 itself, which then serves as a building support. In FIG. 1, the object 2 to be formed in the container 5 on the building platform 12 is shown below the working plane 7 in an intermediate state with several solidified layers, surrounded by building material 13 that remained unsolidified.

The laser sintering device 1 further comprises a storage container 14 for a building material 15 which can be solidified through electromagnetic radiation and an application device 16 which is movable in a horizontal direction H for an application of the building material 15, preferably of a building material in powder form, within the build area 8. Optionally, a radiant heater 17 is arranged in the process chamber 3, which serves for heating the applied building material 15. As a radiant heater 17 an infrared heater can be provided, for example.

The laser sintering device 1 further comprises an exposure device 20 with a laser 21 which produces a laser beam 22 which is deflected by a deflection device 23 and focused upon the working plane 7 by way of a focusing device 24 through a coupling window 25 which is arranged on the upper side of the processing chamber 3 in the chamber wall 4.

Furthermore, the laser sintering device comprises a sensor 32 which is suited to detect a process radiation 33 which is emitted when the laser beam 22 impacts on the building material 15 in the working plane 7. The sensor 32 is connected to a process monitoring device 34. Here, the sensor 32 can be arranged in the processing chamber 3 as shown in FIG. 1. Alternatively, it is also possible to arrange the sensor 32 outside of the processing chamber 3 and to allow the process radiation 33 to impinge on the sensor 32 through a second window.

The sensor 32 can, for example, be designed as an optical camera or as a photodiode for detecting an electromagnetic radiation emitted by the incident laser beam 22, or as a temperature sensor for detecting an emitted thermal radiation. Furthermore, also a plurality of sensors 32 can be provided in the laser sintering device 1 for detecting an optical and/or thermal process radiation 33.

Furthermore, the modified laser sintering device 1 comprises a control unit 29 by which the individual components of the device 1 can be controlled in a coordinated manner in order to implement the building process. Here, the exposure device 20 is controlled by means of an exposure control device 31, which receives corresponding control commands from the control unit 29. Optionally, a buffer 30 can be provided between the control unit 29 and the exposure control device 31 in order to cache the control commands to be transferred to the exposure device 20 from the exposure control device 31. The exposure control device 31 has a first data output interface 36 at which the control commands are output to the exposure device 20 as well as a second data output interface 37 at which further data can be output to the process monitoring device 34.

The process monitoring device 34 and the control unit 29 are optionally connected electronically to a common database 35. Furthermore, the laser sintering device 1 can also comprise further means (not shown in FIG. 1) for storing and/or evaluating and/or visualizing the data. In addition to the first and second data output interfaces 36, 37, further data output and data input interfaces are provided which, however, are not shown in FIG. 1 for the sake of simplifying the illustration.

Alternatively, the control unit 29 and/or the buffer 30 and/or the exposure control device 31 and/or the process monitoring device 34 and/or the database 35 can also be partially or completely arranged outside of the device. The control unit 29 and/or the exposure control device 31 and/or the process monitoring device 34 can comprise a CPU, the operation of which is controlled by a computer program (software). The computer program can be stored separately from the device on a storage medium from which it can be loaded into the device, in particular into the control unit or control units.

To control the exposure device 20, the exposure control device 31 outputs control commands via the first data output interface 36. Such a control command comprises for a particular layer of the three-dimensional object 2 the coordinates of the positions to be solidified in this layer, that is, of the cross-section of the object in the layer, or of at least a sub-region of the cross-section of the object. The coordinates on which the control commands are based are typically calculated by a computer program from a computer model (for example, a CAD model) of the object to be produced and already exist before the object is produced. Furthermore, the control command comprises the exposure type with which the cross-section of the object or sub-region of the cross-section of the object corresponding to the coordinates is to be solidified. Here, an exposure type is defined at least by a specific scanning pattern with which the region to be solidified is to be scanned by the laser beam 22 and by the radiation energy density of the laser beam 22. In addition, an exposure type can also specify the beam diameter and/or the shape of the beam cross-section of the laser beam 22.

As the layer information is already at hand before the object is produced, it is also known which planar sub-regions the object's cross-sections within the individual layers consist of. A sub-region can be, for example, a contour region, a so-called downskin region, a so-called upskin region, an inner region or a support region. A contour region corresponds to a marginal region of the object and is thus located on an outer or inner surface of the completed object. The inner region corresponds to the entire cross-sectional area minus the contour region. A downskin region is located directly above powder that remained unsolidified during building, while an upskin region, after solidification and during the further production process, is directly covered by powder which is not solidified. A support region is a region that forms a part of a support structure for the object to be produced. As different requirements, for example, in regard to the achieved density, porosity, surface quality, shape accuracy and/or exposure speed, are imposed on the different sub-regions, a specific exposure type is assigned to each type of sub-region and the information on this is stored in the control commands, as described above.

During operation of the laser sintering or laser melting device 1, in order to apply a powder layer, the carrier 10 is first lowered by an amount which corresponds to the desired layer thickness. The application device 16 first moves to the storage container 14 and receives therefrom a quantity of the building material 15 sufficient for applying a layer. It then moves over the build area 8 and there applies a thin layer of the building material 15 in powder form onto the building support or a previously existing powder layer. Application takes place at least over the entire cross-section of the object 2 to be produced, preferably over the entire build area 8, i.e. the area bounded by the container wall 6. Optionally, the building material 15 in powder form is heated to a working temperature by means of a radiant heater 17. The cross-section of the object 2 to be produced is then scanned by the laser beam 22 so that the building material 15 in powder form is solidified at the positions corresponding to the cross-section of the object 2 to be produced. By doing so, the powder grains are partly or completely melted at these positions by the energy introduced by the radiation so that they exist joined together as a solid body after cooling. Here, the scanning of the object cross-section of the object 2 to be produced takes place in individual sub-regions, as described above, with an exposure type being assigned to each type of sub-region. The melt pool resulting from the impact of the laser beam 22 on the powder surface emits a process radiation 33 which impinges on the sensor 32 and is registered by the latter.

These steps are repeated until the object 2 is completed and can be removed from the processing chamber 3.

Figure 2:
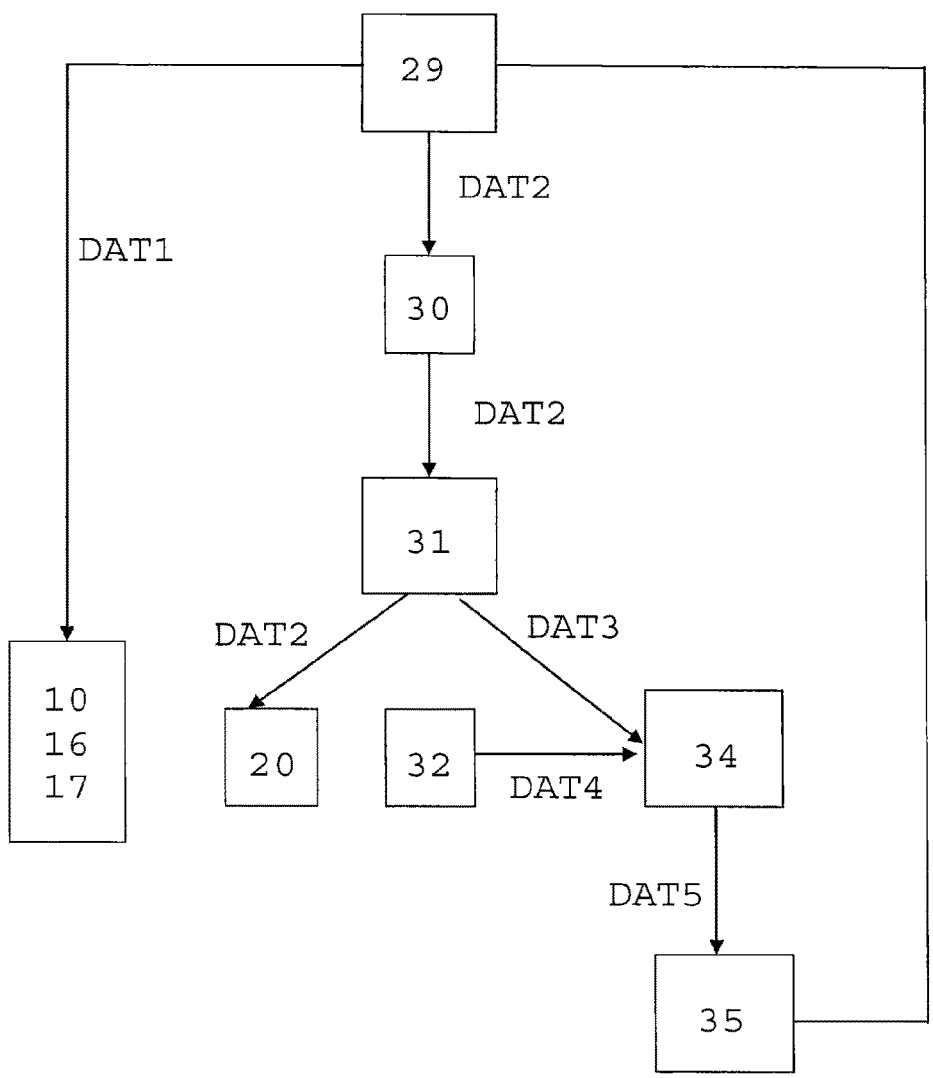
FIG. 2 shows a schematic block diagram, which schematically shows the dataflow in such a device.

FIG. 2 shows a diagram showing the data flow during operation of the laser sintering device 1. The database 35 transfers control commands to the control device 29. The latter controls in a coordinated manner the steps of applying the powder, of heating the powder layer optionally, and of lowering the carrier 10 via a first dataset DAT1. A second dataset DAT2 comprises the control commands for the exposure device 20, i.e. the coordinates of the sub-regions of the cross-sectional area to be solidified in the respective layer, and the exposure type assigned to the sub-region. This second dataset DAT2 is cached in a buffer 30 and from there is transferred to the exposure control device 31 so that the exposure control device can access a second control command immediately after processing a first control command and executing the first control command by the exposure device 20. The control command is output to the exposure device 20 via the first data output interface. A third dataset DAT3 is output from the exposure control device 31 to the process monitoring device 34 via the second data output interface, wherein the output of the third dataset DAT3 takes place in real-time, i.e. within a predetermined period of time, preferably simultaneously, with respect to the output of the second dataset DAT2 to the exposure device 20. The dataset DAT3 comprises the exposure type specified by the dataset DAT2, as well as the coordinates of the sub-region to be irradiated. In the process monitoring device 34, the dataset DAT3 is associated with a dataset DAT4, which comprises the melt pool signal detected by the sensor 32. In this way, its detection location in the object as well as the information about the exposure type used during exposure is assigned to a melt pool signal. This combined information is stored in a fifth dataset DAT5 in a database 35. The dataset DAT5 can then be used, for example, for an object-specific evaluation of the melt pool signal, taking into account the various exposure types, for determining a quality and/or properties of the object. Furthermore, the evaluated melt pool signal can be graphically displayed by a visualization device (not shown).

The device described in FIGS. 1 and 2 can also be implemented without a buffer for caching data. In this case, the control commands are directly output from the control unit to the exposure control device. Furthermore, the device can be implemented without a common database, to which the control unit and the process monitoring device are connected. In this case, the process monitoring device can have a separate memory for storing the dataset DAT5 and/or a visualization device for graphically displaying the data.

The third dataset DAT3 which is output from the exposure control device via the second data output interface can alternatively comprise only the information on the exposure type used. The dataset DAT5 then only comprises the detected melt pool signal in conjunction with the corresponding exposure type without indicating the coordinates specifying the detection location in the object. By means of a chronology of the stored information, this information can then be assigned to a detection location in the object if necessary.

Even though just a single object to be produced is shown in FIG. 1, it is also possible to produce several objects simultaneously in one or more containers. For this purpose, the building material is scanned layer-wise by the energy beam at all positions corresponding to the cross-sections of the objects in the respective layer.

Even though the present invention has been described by way of a laser sintering or laser melting device, it is not restricted to laser sintering or laser melting. It can be applied to any methods of generatively producing a three-dimensional object by a layer-wise application and a selective solidification of a building material by a scanning with an energy beam.

The exposure device can, for example, comprise one or more gas or solid-state lasers, or any other type of laser, e.g. laser diodes, in particular VCSEL (Vertical Cavity Surface Emitting Laser) or VECSEL (Vertical External Cavity Surface Emitting Laser), or an array of these lasers. In general, any device with which energy as radiation in waveform or particle radiation can be selectively applied to a layer of the building material can be used as exposure device. Instead of a laser, for example, a different light source, an electron beam or any other source of energy or radiation source can be used which is suitable for solidifying the building material.

Various materials can be used as a building material, preferably powders, in particular metal powders, plastic powders, ceramic powders, sand, filled or mixed powders, or pasty materials as well.

The invention claimed is:

1. An exposure control device for equipping or retrofitting a generative layer-wise building device for production of at least one three-dimensional object from a building material layer by layer by solidification of the building material by means of a heat supply to positions corresponding to the cross-section of an object in a layer by selectively scanning the layer with electromagnetic radiation or particle radiation, wherein the generative layer-wise building device comprises:

an exposure device which emits electromagnetic radiation or particle radiation and is configured to irradiate positions to be solidified in a layer in such a way that after cooling the positions exist as an object cross-section or part of the object cross-section in the respective layer, wherein the exposure control device has a first data output interface, at which control commands are output to the exposure device so that the exposure device scans, in accordance with the control commands, positions of a layer of the building material with electromagnetic radiation or particle radiation, wherein the control commands which are output via the first data output interface specify one of a plurality of exposure types wherein an exposure type is defined by a predetermined combination of a radiation energy density to be emitted by the exposure device and a scanning pattern with which the radiation is being directed to a region of a layer of the building material, wherein the exposure control device has a second data output interface at which an exposure type is output in real time in relation to a timing of an output of a control command specifying the exposure type to a process monitoring device via the second data output interface, wherein the output of the exposure type takes place within a predetermined period of time before or after the output of the associated control command, wherein the process monitoring device comprises at least one sensor which is capable of detecting a process radiation emitted by the building material upon the incidence of the radiation emitted by the exposure device onto the building material, and wherein a signal from the at least one sensor is used together with the output exposure type associated with the output control command to obtain at least one of a quality or property of the three-dimensional object.

2. The exposure control device according to claim 1, wherein the exposure control device can simultaneously output the data at the first and second data output interfaces.

3. The exposure control device according to claim 1 wherein, during operation, a time offset between the output of an exposure type via the second data output interface and the output of a control command specifying the exposure type via the first data output interface is always less than 5 milliseconds (ms).

4. The exposure control device according to claim 1, further comprising a buffer for storing control commands to be output via the first data output interface.

5. The exposure control device according to claim 1, wherein, with the output of a control command via the first data output interface, which control command specifies coordinates of a location to be irradiated by the exposure device on the layer of building material, the coordinates are output in a temporally coordinated manner via the second data output interface.

6. The exposure control device according to claim 5, wherein a time offset between the output of the coordinates via the second data output interface and the output of a control command specifying the coordinates of a location to be irradiated by the exposure device on the layer of building material via the first data output interface is always below 5 ms.

7. The exposure control device according to claim 1, wherein the exposure device emits at least one beam with at least one of a defined diameter, a defined shape of the cross-section of the beam, and a defined intensity profile and the exposure types furthermore specify at least one of a diameter, a shape of the cross-section of the beam, and an intensity profile.

8. The exposure control device according to claim 3, wherein, with the output of a control command via the first data output interface, which control command specifies coordinates of a location to be irradiated by the exposure device on the layer of building material, the coordinates are output in a temporally coordinated manner via the second data output interface.

9. The exposure control device according to claim 8, wherein a time offset between the output of the coordinates via the second data output interface and the output of a control command specifying the coordinates of a location to be irradiated by the exposure device on the layer of building material via the first data output interface is always below 5 ms.

10. A generative layer-wise building device for production of at least one three-dimensional object from a building material layer by layer by solidification of the building material by means of a heat supply to positions corresponding to the cross-section of an object in a layer, by selectively scanning the layer with electromagnetic radiation or particle radiation, wherein the generative layer-wise building device comprises:

an exposure device which emits electromagnetic radiation or particle radiation and is configured to irradiate positions to be solidified in a layer in such a way that after cooling the positions exist as an object cross-section or part of the object cross-section in the respective layer, an exposure control device, which has a first data output interface, at which control commands are output to the exposure device so that the exposure device scans, in accordance with the control commands, positions of a layer of the building material with electromagnetic radiation or particle radiation, wherein the control commands which are output via the first data output interface specify one of a plurality of exposure types wherein an exposure type is defined by a predetermined combination of a radiation energy density to be emitted by the exposure device and a scanning pattern with which the radiation is being directed to a region of a layer of the building material, wherein the exposure control device has a second data output interface at which an exposure type is output in real time in relation to a timing of an output of a control command specifying the exposure type to a process monitoring device via the second data output interface, wherein the output of the exposure type takes place within a predetermined period of time before or after the output of the associated control command, wherein the process monitoring device comprises at least one sensor which is capable of detecting a process radiation emitted by the building material upon the incidence of the radiation emitted by the exposure device onto the building material, wherein a signal from the at least one sensor is used together with the output exposure type associated with the output control command to obtain at least one of a quality or property of the three-dimensional object, an application device for applying a layer of the building material on a surface of a building support or an already existing layer, and a control device which controls the application device and the exposure device so that an application step and a solidification step are repeated successively until all cross-sections of the at least one three-dimensional object to be produced are solidified.

11. The generative layer-wise building device according to claim 10, which is configured such that the control device transfers to the exposure control device the control commands to be outputted by the exposure control device to the exposure device.

12. The generative layer-wise building device according to claim 10, wherein the process monitoring device is capable of detecting the changes of a property of the building material that are generated when the radiation emitted by the exposure device is incident on the building material.

13. The generative layer-wise building device according to claim 12, wherein the process monitoring device and the control device are connected to a common database.

14. A method of exposure control for application in a generative layer-wise building device for production of at least one three-dimensional object from a building material layer by layer by solidification of the building material by means of a heat supply to positions corresponding to the cross-section of an object in a layer, by selectively scanning the layer with electromagnetic radiation or particle radiation, wherein the generative layer-wise building device comprises:

an exposure device which emits electromagnetic radiation or particle radiation and is configured to irradiate positions to be solidified in a layer in such a way that after cooling the positions exist as an object cross-section or part of the object cross-section in the respective layer, an exposure control device with a first data output interface and a second data output interface, and a process monitoring device comprising at least one sensor;

the method comprising:

outputting, with the first data output interface control commands to the exposure device so that the exposure device scans, in accordance with the control commands, positions of a layer of the building material with electromagnetic radiation or particle radiation, wherein the control commands which are output via the first data output interface specify one of a plurality of exposure types wherein an exposure type is defined by a predetermined combination of a radiation energy density to be emitted by the exposure device and a scanning pattern with which the radiation is being directed to a region of a layer of the building material, outputting, with the second data output interface, an exposure type in real time in relation to a timing of an output of a control command specifying the exposure type to the process monitoring device via the second data output interface, wherein the output of the exposure type takes place within a predetermined period of time before or after the output of the associated control command, detecting, with the at least one sensor of the process monitoring device, a process radiation emitted by the building material upon the incidence of the radiation emitted by the exposure device onto the building material, and using a signal from the at least one sensor together with the output exposure type associated with the output control command to obtain at least one of a quality or property of the three-dimensional object.

* * * * *